(12) United States Patent
Fox-Rabinovitz et al.

(10) Patent No.: US 12,535,133 B2
(45) Date of Patent: Jan. 27, 2026

(54) DESTRUCTIVE BRAKING SYSTEMS

(71) Applicant: Torc Robotics, Inc., Blacksburg, VA (US)

(72) Inventors: Joseph R. Fox-Rabinovitz, Blacksburg, VA (US); William Davis, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 65 days.

(21) Appl. No.: 18/407,817

(22) Filed: Jan. 9, 2024

(65) Prior Publication Data

US 2025/0224033 A1 Jul. 10, 2025

(51) Int. Cl.
| | |
|---|---|
| *F16H 61/16* | (2006.01) |
| *B60Q 9/00* | (2006.01) |
| *B60W 60/00* | (2020.01) |
| *G08G 1/16* | (2006.01) |

(52) U.S. Cl.
CPC ............... *F16H 61/16* (2013.01); *B60Q 9/00* (2013.01); *B60W 60/0015* (2020.02); *G08G 1/166* (2013.01); *B60W 2554/4029* (2020.02); *B60W 2554/802* (2020.02); *B60W 2710/1094* (2013.01); *B60W 2754/20* (2020.02)

(58) Field of Classification Search
CPC ..... B60W 60/0015; B60W 2554/4029; B60W 2554/802; B60W 2710/1094; B60W 2754/20; F16H 61/16; G08G 1/166; B60Q 9/00
USPC .......................................................... 701/23
See application file for complete search history.

(56) References Cited

U.S. PATENT DOCUMENTS

| | | | |
|---|---|---|---|
| 2,730,196 A | 1/1956 | Kirk | |
| 10,543,837 B2 | 1/2020 | Patana | |
| 11,007,988 B2 | 5/2021 | Laine et al. | |
| 11,535,245 B2 | 12/2022 | Laughlin et al. | |
| 11,623,622 B2 * | 4/2023 | Buerkle | B60T 7/22 |
| | | | 701/70 |

(Continued)

FOREIGN PATENT DOCUMENTS

AU 2024200848 A1 * 8/2024 ............ B60W 50/14

OTHER PUBLICATIONS

Vasudevan, et al., "Cloud-Integrated Deep Learning for Predictive Emergency Braking in Autonomous Vehicles," 2024 International Conference on Sustainable Communication Networks and Application (ICSCNA), Theni, India, 2024, pp. 541-546 (https://ieeexplore.ieee.org/document/10864179) (Year: 2024).*

*Primary Examiner* — Atul Trivedi
(74) *Attorney, Agent, or Firm* — Armstrong Teasdale LLP

(57) ABSTRACT

A system for destructive braking system for an autonomous truck traveling on a roadway includes an electronic control unit (ECU) configured for controlling a transmission for the autonomous truck. The destructive braking system includes a processing system communicatively coupled to the ECU, the processing system including a processor coupled to a memory. The memory stores executable instructions that, upon execution by the processor, configure the processor to receive an indication the autonomous truck will unavoidably collide with an object. The processor is further configured to determine to employ destructive braking. The processor is further configured to instruct the ECU to reverse the transmission to reduce momentum of the autonomous truck.

21 Claims, 9 Drawing Sheets

(56) References Cited

U.S. PATENT DOCUMENTS

| | | | |
|---|---|---|---|
| 11,820,255 B2* | 11/2023 | Rajaie | B60L 7/18 |
| 2013/0037355 A1 | 2/2013 | Baker et al. | |
| 2013/0054103 A1* | 2/2013 | Herink | B60T 7/22 |
| | | | 701/65 |
| 2018/0052463 A1* | 2/2018 | Mays | G07C 5/0808 |
| 2018/0372875 A1* | 12/2018 | Juelsgaard | G01S 17/931 |
| 2019/0210595 A1* | 7/2019 | Cheaz | B60W 40/06 |
| 2019/0263365 A1 | 8/2019 | Krasnoff | |
| 2021/0107470 A1* | 4/2021 | Oboril | B60W 40/06 |
| 2021/0362543 A1 | 11/2021 | Howard | |
| 2022/0012988 A1* | 1/2022 | Avadhanam | G06N 3/08 |
| 2022/0169214 A1 | 6/2022 | Zhou et al. | |
| 2022/0227360 A1* | 7/2022 | Delhaye | G06N 3/08 |
| 2022/0314942 A1* | 10/2022 | Costin | B60Q 9/008 |
| 2022/0348227 A1* | 11/2022 | Foster | B60Q 1/507 |
| 2022/0379924 A1* | 12/2022 | Foster | B60W 30/16 |
| 2022/0410894 A1* | 12/2022 | Foster | G06V 20/588 |
| 2023/0140569 A1* | 5/2023 | Foster | B60W 30/146 |
| | | | 701/400 |
| 2023/0256999 A1* | 8/2023 | Donderici | B60W 50/0097 |
| | | | 701/301 |
| 2023/0278581 A1* | 9/2023 | Ollis | B60W 60/0011 |
| | | | 701/23 |
| 2023/0331252 A1* | 10/2023 | Tian | G01S 17/931 |
| 2023/0339459 A1* | 10/2023 | Chi-Johnston | G06F 11/3668 |
| 2023/0339502 A1* | 10/2023 | Chi-Johnston | G06N 20/00 |
| 2023/0339519 A1* | 10/2023 | Chi-Johnston | B60W 50/0097 |
| 2023/0347882 A1* | 11/2023 | Tian | B60W 40/04 |
| 2024/0062656 A1* | 2/2024 | Forscher | G08G 1/163 |
| 2024/0109558 A1* | 4/2024 | Goradia | B60W 50/029 |
| 2024/0246537 A1* | 7/2024 | Kurutach | B60W 60/00274 |
| 2024/0286635 A1* | 8/2024 | Raj | B60W 60/001 |
| 2024/0308540 A1* | 9/2024 | Cui | B60W 60/0011 |
| 2024/0317260 A1* | 9/2024 | Donderici | B60W 60/0015 |
| 2024/0359683 A1* | 10/2024 | Perez Barrera | G06V 20/58 |
| 2024/0375645 A1* | 11/2024 | Perez Barrera | B60W 60/0027 |
| 2024/0383479 A1* | 11/2024 | Awathe | B60W 50/14 |
| 2024/0416898 A1* | 12/2024 | Perez Barrera | B60W 60/0015 |
| 2025/0058770 A1* | 2/2025 | Larsson | B60W 40/09 |
| 2025/0091575 A1* | 3/2025 | Larsson | B60W 30/0956 |
| 2025/0222923 A1* | 7/2025 | Fox-Rabinovitz | B60W 60/0015 |
| 2025/0224033 A1* | 7/2025 | Fox-Rabinovitz | G08G 1/166 |

* cited by examiner

DESTRUCTIVE BRAKING SYSTEMS

TECHNICAL FIELD

The field of the disclosure relates generally to autonomous vehicles and, more specifically, to systems and methods for destructive braking for an autonomous truck.

BACKGROUND OF THE INVENTION

Tractor trailers are generally very heavy and require far greater distance to stop when compared to typical passenger vehicles. Consequently, collisions involving tractor trailers tend to carry greater risk of injury to humans or wildlife, and a greater risk of damage to property. Under certain circumstances, sometimes beyond the control of the tractor trailer itself, a collision becomes unavoidable. Accordingly, there is a need to mitigate injury and damage in such collisions as a safeguard to other drivers and vehicles in the vicinity.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed destructive braking system for an autonomous truck traveling on a roadway includes an electronic control unit (ECU) configured for controlling a transmission for the autonomous truck. The destructive braking system includes a processing system communicatively coupled to the ECU, the processing system including a processor coupled to a memory. The memory stores executable instructions that, upon execution by the processor, configure the processor to receive an indication the autonomous truck will unavoidably collide with an object. The processor is further configured to determine to employ destructive braking. The processor is further configured to instruct the ECU to reverse the transmission to reduce momentum of the autonomous truck.

In another aspect, the disclosed processing system for destructive braking for an autonomous truck includes a memory and a processor. The memory stores executable instructions representing a destructive braking module. The processor is configured to execute the destructive braking module. The processor, upon execution of the destructive braking module, is configured to receive an indication the autonomous truck will unavoidably collide with an object. The processor is configured to determine to employ destructive braking and instruct an ECU configured to control a transmission of the autonomous truck to reverse the transmission to reduce momentum of the autonomous truck.

In yet another aspect, the disclosed method of destructive braking for an autonomous truck includes receiving an indication the autonomous truck will unavoidably collide with an object, determining to employ destructive braking, and initiating reversing of a transmission of the autonomous truck to reduce momentum of the autonomous truck.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
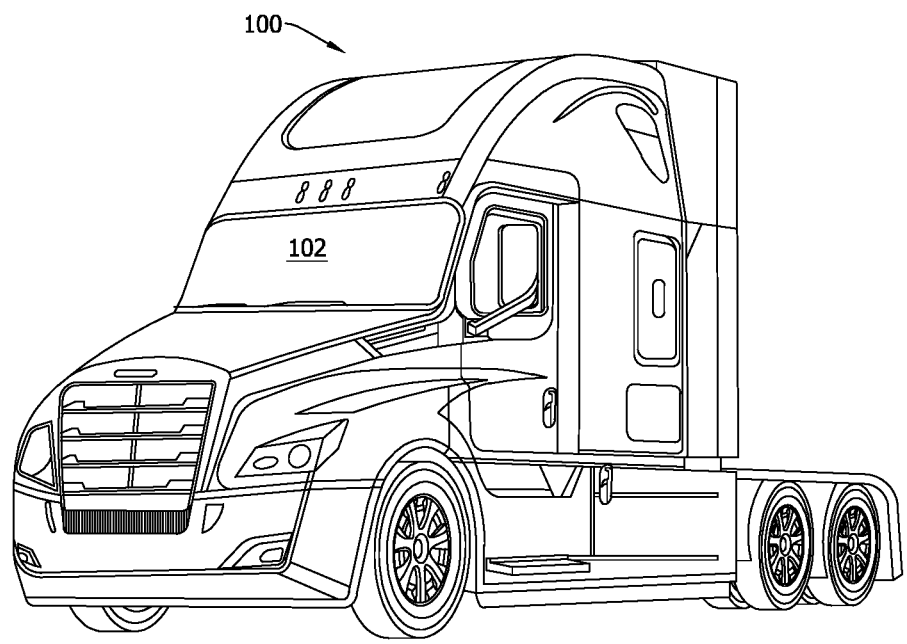
FIG. 1 is an illustration of an example autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

Any motor vehicle can encounter circumstances in which a collision is unavoidable, potentially with another vehicle, a structure, an object, a person, or wildlife, and generally occurring imminently. For a tractor trailer, such a collision poses a potential danger to the occupants of the truck as well as whoever or whatever is in the path of the tractor trailer. An autonomous truck generally eliminates the danger to occupants of the truck, leaving only the risk of injury and damage to others to be involved in the collision. Accordingly, it is reasonable to consider all means of avoiding or mitigating the imminent collision, up to and including destructive braking of the autonomous truck. Destructive braking includes actions taken by the autonomous truck to sacrifice one or more components of the autonomous truck or trailer, or both to quickly slow the autonomous truck and trailer and avoid or at least mitigate the effects of what would otherwise be an unavoidable collision.

Whether a collision is unavoidable is an objectively computable determination based generally on the velocity and momentum of the autonomous truck and trailer, the stopping power of various components of the autonomous truck and trailer, and the surroundings of the autonomous truck. Given an imminent and unavoidable collision, the disclosed destructive braking systems assess whether the collision could be avoided by employing a destructive braking mechanism, including, for example, steering the autonomous truck into a collision with a structure, reversing the transmission, or placing the autonomous truck (or components of the truck) on the road to create drag (e.g., by dropping a friction plate, landing gear, rupturing tires on one or more axles of the autonomous truck and trailer, or ejecting wheels on one or more axles, resulting in significant damage or loss of the autonomous truck or trailer, or both. The initiative to employ destructive braking is greatest when a human being is detected or expected to be present in the imminent collision, i.e., one or more lives can be saved by avoiding or mitigating the collision, which should be done at any cost. When no lives are at risk, then the determination to employ destructive braking more flexibly weighs the costs and benefits of avoiding or mitigating such a collision. The assessment by the disclosed destructive braking systems may be configured by a given autonomous truck operator, for example, to activate destructive braking to avoid injuring wildlife or to avoid damage to property. In one implementation, an operator of the autonomous truck may elect to avoid destructive braking where there are only inanimate objects or other property to be involved in the imminent collision.

The disclosed systems and methods include a processing system such as an autonomy computing system or another embedded computing system, such as an electronic control unit (ECU). The processing system includes at least one or more processors and one or more memory devices. The one or more memory devices include a section of memory storing commands and data defining a destructive braking module, which may be one or more hardware modules, software modules, or a combination of hardware and software. The processing system, upon executing the disclosed destructive braking module, and upon receipt of a determination that a collision is unavoidable, determines whether destructive braking should be applied and, if so, initiates the action by transmitting one or more commands, i.e., destructive braking commands, to other modules in the autonomy computing system, or other systems or subsystems on the autonomous truck to execute the destructive braking.

In one embodiment of the disclosed destructive braking systems, the destructive braking commands are destined for one or more ECUs operating the transmission of the autonomous truck. The destructive braking command instructs the ECU to reverse the transmission, which is nearly certain to significantly damage or destroy the transmission and possibly elements of the engine for a conventional combustion engine. Damage to an electric autonomous truck could potentially be less. By reversing the transmission, the command for which can be issued on the order of milliseconds after the determination is made that a collision is unavoidable, the destructive braking system can reduce the momentum of the autonomous truck and trailer to a level that either avoids or mitigates the imminent collision. In certain embodiments, the destructive braking system is combined with equipping the autonomous truck with tires having a greater coefficient of friction. The greater coefficient of friction improves the stopping power of the reversed transmission action.

In another embodiment of the disclosed destructive braking systems, the destructive braking commands are destined for one or more ECUs or other embedded computing system configured to place, or "drop," the autonomous truck or components of the autonomous truck onto the roadway to create maximum drag. For example, the destructive braking system may blow, or rupture, tires on one or more axles of the autonomous truck or trailer, or both. Similarly, the wheels may be ejected from the axle with a mechanism for retaining the ejected wheels near their original location to prevent further damage to nearby drivers, vehicles, and structures. Once wheels are ejected or tires are ruptured, the autonomous truck would fall to the road and slow significantly while sliding on some combination of its undercarriage and wheel hubs. In one embodiment, for example, the destructive braking commands instructed that all tires on the autonomous truck and trailer be ruptured to reduce speed of the autonomous truck and trailer, and to avoid or mitigate the imminent collision. The mechanism for rupturing the tires can be any fast-acting mechanism including, for example, a mechanical puncture or a controlled explosion. Mechanical punctures or controlled explosions can be instructed on the order of milliseconds after the determination is made that a collision is unavoidable. Mechanical puncture mechanisms may include, for example, a bolt, spike, or other projectile driven electromechanically by a solenoid or actuator, mechanically by a spring, pneumatic, or hydraulic press, or explosively by a controlled charge. Alternatively, a chemical or explosive charge could be employed to rapidly increase pressure on the tire resulting in a rupture.

In another embodiment, the destructive braking system may instruct that a component such as a friction plate beneath the autonomous truck or a landing gear on the trailer be deployed, or thrust down, onto the roadway to create drag on the autonomous truck or trailer. While damage to the core of the autonomous truck and trailer may be reduced in such embodiments, thrusting components of the autonomous truck or trailer onto the roadway can cause significant damage to the road itself. However, damage to the road is generally simpler and less costly to repair, and always preferable to risking lives.

FIG. 1 is an illustration of an example autonomous truck 100 including a cab 102. Other example autonomous trucks may exclude cab 102 when no human driver is required.

Figure 2:
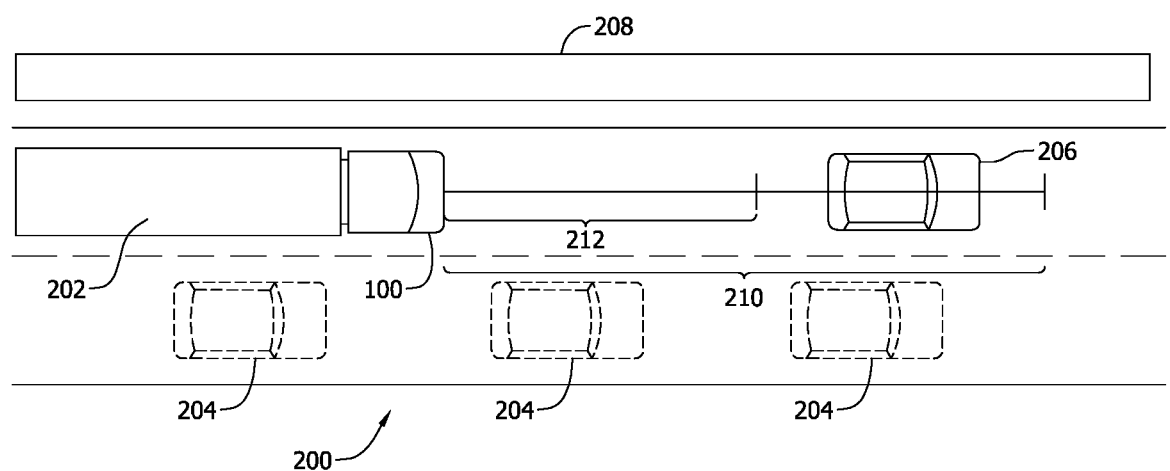
FIG. 2 is an illustration of an unavoidable collision on a roadway.

FIG. 2 is an illustration of an unavoidable collision on a roadway 200, involving autonomous truck 100 shown in FIG. 1. Autonomous truck 100 is illustrated operating on roadway 200, pulling a trailer 202 and moving among various other vehicles or objects in roadway 200. In particular, various other vehicles 204 occupy the right lane and autonomous truck 100 is approaching an object 206 in roadway 200. Object 206 may be another vehicle moving in the same direction as autonomous truck 100, a structure, debris, a person, or wildlife, or any other object with which a collision should be avoided under normal circumstances. Additionally, roadway 200 is bounded on the left side by a fixed barrier structure 208.

Given autonomous truck 100's current velocity and momentum, a normal emergency stopping distance 210 is known, or computable, for autonomous truck 100. In the illustration of FIG. 2, in the event of a rapid unforeseen appearance or deceleration of object 206, the velocity of autonomous truck 100 and computed normal emergency stopping distance 210, indicates a collision between autonomous truck 100 and object 206 is unavoidable and imminent. The disclosed destructive braking system computes a destructive braking distance 212 that suggests the collision can be avoided if destructive braking is employed. For example, the disclosed destructive braking systems may (a) steer autonomous truck 100 into fixed barrier structure 208 as a mode of destructive braking, (b) reverse the transmission on autonomous truck 100, (c) rupture tires on one or more axles of autonomous truck 100 or trailer 202, (d) eject wheels from one or more axles of autonomous truck 100 or trailer 202, or (e) deploy a friction plate, trailer landing gear, or other component of autonomous truck 100 down onto roadway 200.

Figure 3:
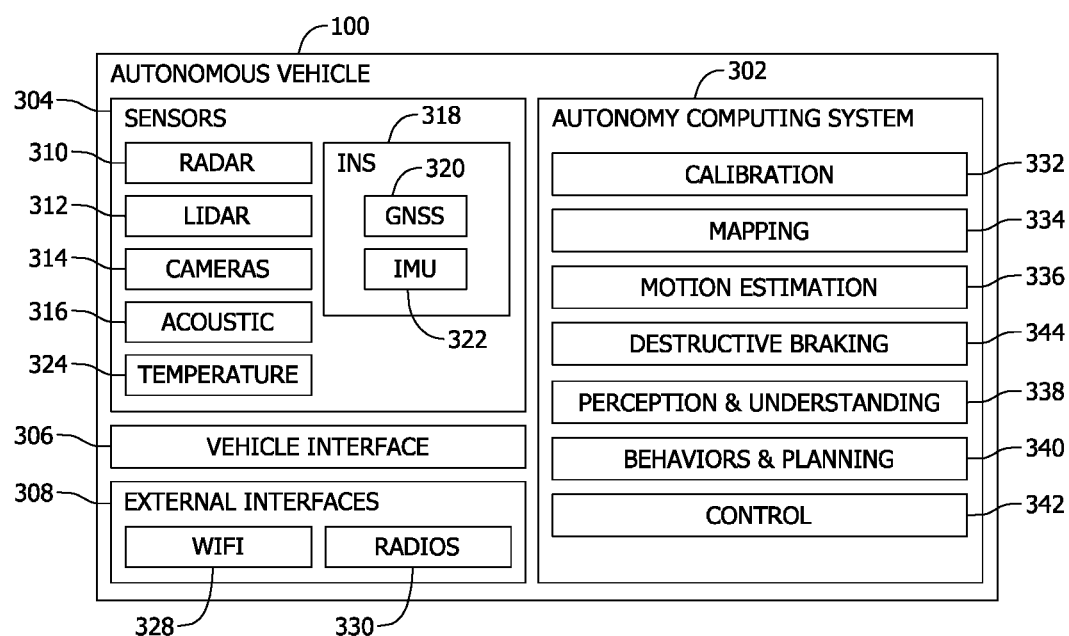
FIG. 3 is a functional block diagram of an embodiment of an autonomous vehicle.

FIG. 3 is a functional block diagram of an embodiment of autonomous vehicle 100. In the example embodiment, autonomous vehicle 100 includes an autonomy computing system 302, sensors 304, a vehicle interface 306, and external interfaces 308.

In the example embodiment, sensors 304 include various sensors such as, for example, radio detection and ranging (RADAR) sensors 310, light detection and ranging (LiDAR) sensors 312, cameras 314, acoustic sensors 316, temperature sensors 324, inertial navigation system (INS) 318, which includes one or more global navigation satellite system (GNSS) receivers 320 and at least one inertial measurement unit (IMU) 322. Other sensors 304 not shown in FIG. 3 may include, for example, audio (e.g., ultrasound), internal vehicle sensors, meteorological sensors, or other types of sensors. Sensors 304 generate respective output signals based on detected physical conditions of autonomous vehicle 100 and its proximity. As described in further detail below, these signals may be used by autonomy computing system 302 to determine how to control operation of autonomous vehicle 100.

Cameras 314 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 314 and the images from each of the multiple cameras 314 may be stitched or combined to generate a visual representation of the multiple cameras' fields of view, which may be used to, for example, generate a bird's eye view of the environment surrounding autonomous vehicle 100. In some embodiments, the image data generated by cameras 314 may be sent to autonomy computing system 302 or other aspects of autonomous vehicle 100 and this image data may include autonomous vehicle 100 or a generated representation of autonomous vehicle 100. In some embodiments, one or more systems or components of autonomous vehicle 100 may overlay labels to the features depicted in the image data, such as on a raster layer or other semantic layer of a high-definition (HD) map.

LiDAR sensors 312 generally include a laser generator and a detector that send and receive a LIDAR signal. The LiDAR signal can be emitted and received from any direction such that LiDAR point clouds (or "LiDAR images") of the areas ahead of, to the side, behind, above, or below autonomous vehicle 100 can be captured and represented in the LiDAR point clouds. In some embodiments, autonomous vehicle 100 includes multiple LiDAR lasers and LiDAR sensors 312 and the LiDAR point clouds from each of the multiple LiDAR sensors 312 may be stitched or combined to generate a LiDAR-based representation of the area in the field of view of the LiDAR signal(s). In some embodiments, the LiDAR point cloud(s) generated by the LiDAR sensors and sent to autonomy computing system 302 and other aspects of autonomous vehicle 100 may include a representation of or other data relating to autonomous vehicle 100, such as a location of autonomous vehicle 100 with respect to other detected objects. In some embodiments, the system inputs from cameras 314 and the LiDAR sensors 312 may be fused or used in combination to determine conditions (e.g., locations of other objects) around autonomous vehicle 100.

GNSS receivers 320 are positioned on autonomous vehicle 100 and may be configured to determine a location, velocity, orientation, or clock time of autonomous vehicle 100, which it may embody as GNSS data, as described herein. GNSS receiver 320 may be configured to receive one or more signals from a global navigation satellite system (e.g., global positioning system constellation) to localize autonomous vehicle 100 via geolocation. In some embodiments, GNSS receiver 320 may provide an input to or be configured to interact with, update, or otherwise utilize one or more digital maps, such as an HD map (e.g., in a raster layer or other semantic map). In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, timing data, traffic data, weather data, or other types of data about autonomous vehicle 100 and its environment.

IMUs 322 are electronic devices that measures and report one or more features regarding the motion of autonomous vehicle 100. For example, IMUs 322 may measure a velocity, acceleration, angular rate, and or an orientation of autonomous vehicle 100 or one or more of its individual components using a combination of accelerometers, gyroscopes, or magnetometers. IMUs 322 may detect linear acceleration using one or more accelerometers and rotational rate using one or more gyroscopes and attitude information from one or more magnetometers. In some embodiments, IMUs 322 may be communicatively coupled to one or more other systems, for example, GNSS receivers 620 and may provide an input to and receive an output from GNSS receivers 620.

In the example embodiment, vehicle interface 306 is configured, for example, to send one or more signals to the various aspects of autonomous vehicle 100 that control the motion of autonomous vehicle 100 (e.g., engine, throttle, steering wheel, brakes, etc.) or other components.

In the example embodiment, external interfaces 308 are configured to enable autonomous vehicle 100 to communicate with an external network via, for example, a wired or wireless connection, such as Wi-Fi 328 or other radios 330. In embodiments including a wireless connection, the connection may be a wireless communication signal (e.g., Wi-Fi, cellular, LTE, 5g, Bluetooth, etc.). However, in some embodiments, external interfaces 308 may be configured to communicate with an external network via a wired connection, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 308 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 302 is implemented by one or more processors and memory devices of autonomous vehicle 100. Autonomy computing system 302 includes modules, which may be hardware components (e.g., processors or other circuits) or software components (e.g., computer applications or processes executable by autonomy computing system 302), or a combination of hardware and software, configured to generate outputs, such as control signals, based on inputs received from, for example, sensors 304 or external interfaces 308. These modules may include, for example, a calibration module 332, a mapping module 334, a motion estimation module 336, a perception and understanding module 338, a behaviors and planning module 340, a control module 342, and a destructive braking module 344.

Autonomy computing system 302 detects conditions on the road ahead of autonomous truck 100, including the existence of an unavoidable collision as illustrated, for example, in FIG. 2. Upon determining an unavoidable collision is imminent, autonomy computing system 302 engages destructive braking module 344 to determine whether a mode of destructive braking should be applied to avoid or mitigate the imminent collision.

Figure 4:
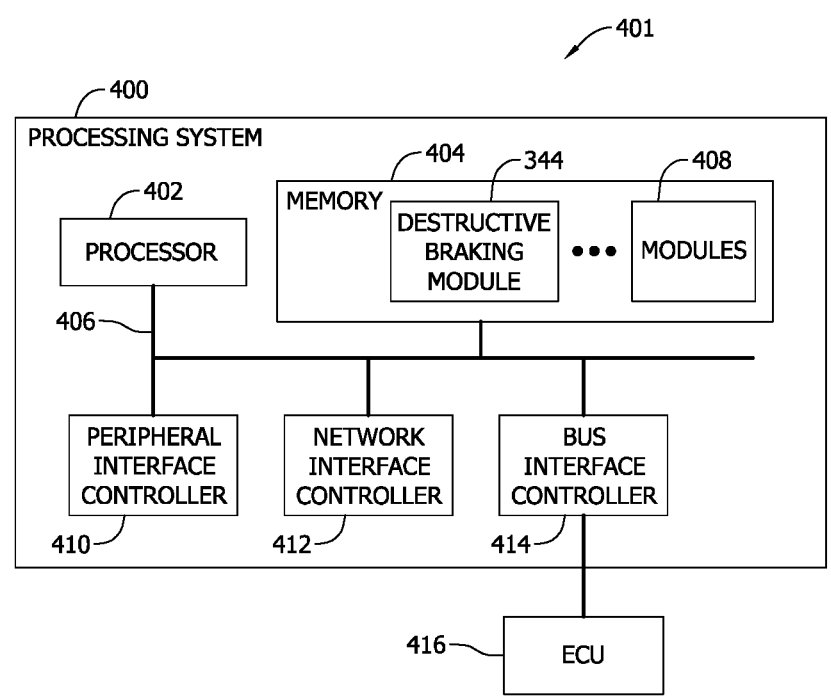
FIG. 4 is a block diagram of an embodiment of a processing system.

FIG. 4 is a block diagram of an embodiment of a processing system 400 that may be embodied in an autonomy computing system, an electronic control unit (ECU), or other suitable embedded computing system. Processing system 400 includes at least one processor 402 and a memory 404. Processor 402 is coupled to memory 404 via a system bus 406. In the example embodiment, memory 404 includes one or more devices that enable information, such as executable instructions or other data, to be stored and retrieved. Memory 404 includes one or more computer readable media, such as, without limitation, dynamic random access memory (DRAM), static random access memory (SRAM), a solid state disk, or a hard disk. In the example embodiment, memory 404 stores, without limitation, application source code, application object code, configuration data, additional input events, application states, assertion statements, validation results, or any other type of data. In particular, memory 404 stores a destructive braking module 344, including program code, and one or more additional software modules 408. Memory 404 may be local to processor 402 or remotely connected via one or more data links.

Processing system 400 further includes various interface controllers for communicating with other processing systems of autonomous truck 100, data networks, peripheral devices, sensors, controllers, ECUs, or one or more other systems or subsystems of autonomous truck 100. The interface controllers include a peripheral interface controller 410 for communicating with one or more peripheral devices, such as sensors (shown in FIG. 6). The interface controllers include a network interface controller 412 for communicating over one or more data networks, such as the Internet. The interface controllers include a bus interface controller 414 for communicating with one or more devices sitting on a bus, such as a CAN bus local to autonomous truck 100. Bus interface controller 414 enables communication with one or more computing systems onboard autonomous truck 100, including, for example, an ECU 416 configured to execute a command for destructive braking. Processing system 400 operates in combination with ECU 416 as a destructive braking system 401.

In the example embodiment, processor 402 is configured by gaining access to one or more sections of program code in memory 404 or another memory device, and executing that program code to perform one or more functions. In operation, a processor 402 executes computer-executable instructions embodied in one or more computer-executable components stored on one or more computer-readable media, such as memory 404, to implement, for example, destructive braking module 344. A particular set of executable instructions or module, such as destructive braking module 344, may be executed on a single instance of processing system 400 or execution may be divided among two or more instances of processing system 400. Likewise, execution of such instructions or modules may be divided among multiple processors 402.

Figure 5:
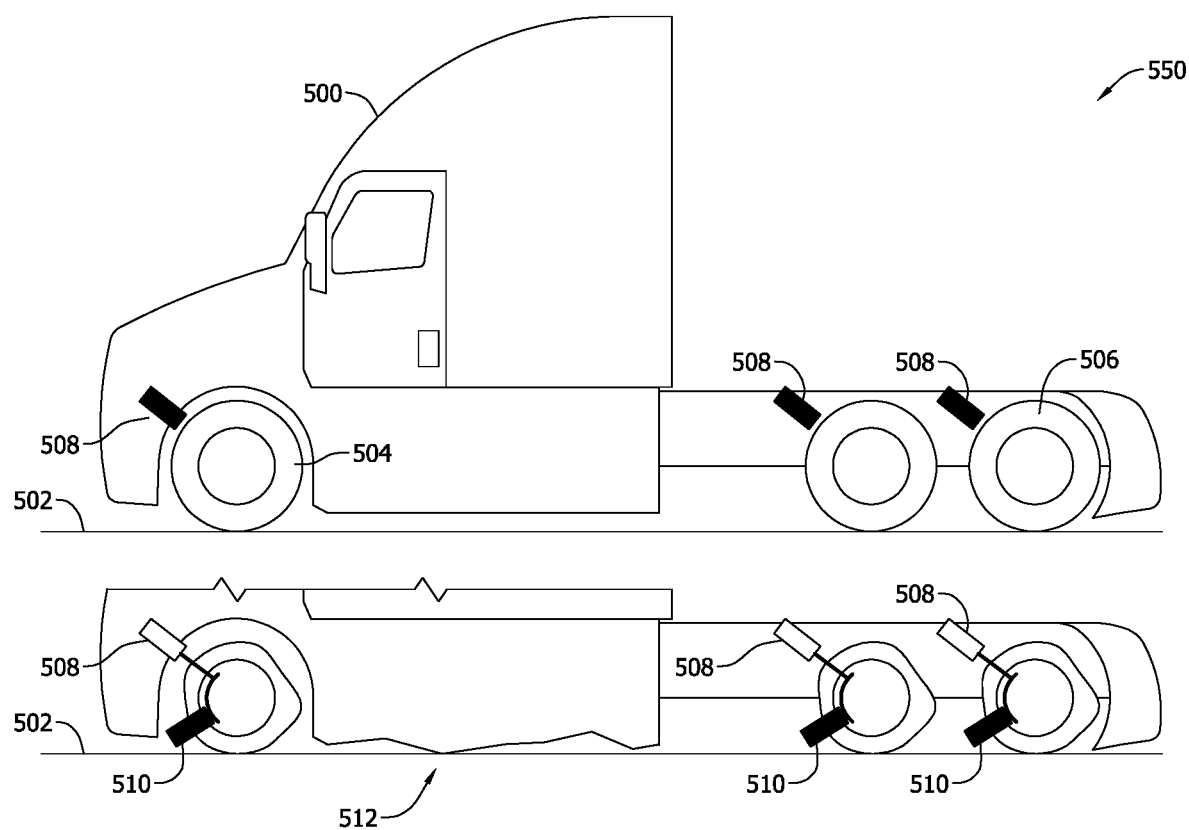
FIG. 5 is a schematic diagram of an embodiment autonomous truck configured to rupture tires as a mode of destructive braking.

FIG. 5 is a schematic diagram of an embodiment autonomous truck 500 on a roadway 502. Autonomous truck 500 includes front tires 504 around front wheels 505 and rear tires 506 around rear wheels 507. Autonomous truck 500 includes mechanisms 508 configured to rupture tires 504 or 506. Mechanisms 508 may include, for example, a device integrated into wheel wells of autonomous truck 500 or the wheels themselves. Referring to FIG. 4, destructive braking system 401 ruptures tires on one or more axles of autonomous truck 500. Mechanism 508 for rupturing the tires 504 and 506 can be any fast-acting mechanism including, for example, a mechanical puncture or a controlled explosion. Mechanical punctures or controlled explosions can be instructed on the order of milliseconds after the determination is made that a collision is unavoidable. Mechanical puncture mechanisms may include, for example, a bolt, spike, blade, or other projectile (e.g., a shotgun slug or equivalent) driven electromechanically by a solenoid or actuator, mechanically by a spring, pneumatic, or hydraulic press, or explosively by a controlled charge. Alternatively, a chemical or explosive charge could be employed to rapidly increase pressure on tire 504 or 506 resulting in a rupture.

FIG. 5 includes an illustration 550 of autonomous truck 500 once tires 504 and 506 are ruptured and autonomous truck 500 is dropped to roadway 502. An undercarriage 512 of autonomous truck 500 contacts roadway 502 to generate additional drag and slow autonomous truck 500. Mechanism 508, in certain embodiments, may place a bolt, spike, or other anchor 510 into wheels 505 or 507 (or tires 504 or 506) to further engage the roadway 502 to slow autonomous truck 500.

In certain embodiments, the wheels 505 and 507 may be textured or knurled to increase friction when they meet roadway 502. Additionally, rims may be collapsible on impact to increase surface area in contact with roadway 502.

Figure 6:
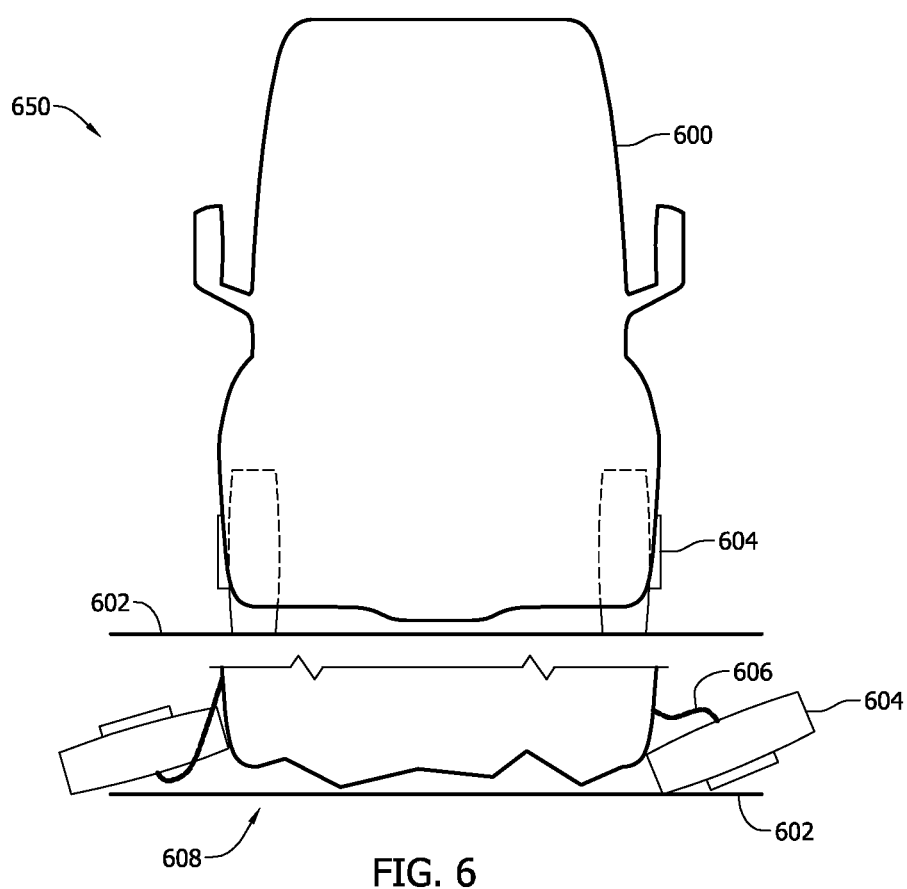
FIG. 6 is a schematic diagram of another embodiment autonomous truck configured to eject wheels as a mode of destructive braking.

FIG. 6 is a schematic diagram of another embodiment autonomous truck 600 on roadway 602. Autonomous truck 600 includes wheels 604. Autonomous truck 600 is configured to eject wheels 604 as a mode of destructive braking. Wheels 604 may be ejected by a mechanical disconnect and a mechanical "pushing" mechanism to force wheels 604 away from autonomous truck 600. The pushing mechanism may be mechanical (e.g., spring, hydraulic, or pneumatic), electrical (e.g., solenoid) or explosive. However, wheels 604 should be retained by a chain 606 or other tether to prevent further damage to nearby drivers, vehicles, or structures.

FIG. 6 includes an illustration 650 of autonomous truck 600 once wheels 604 are ejected and autonomous truck 600 is dropped to roadway 602. Once wheels are ejected or tires are ruptured (as shown in FIG. 5), the autonomous truck 500 or 600 would fall to the road and slow significantly while sliding on some combination of its undercarriage 608, anchors, and wheel hubs.

Figure 7:
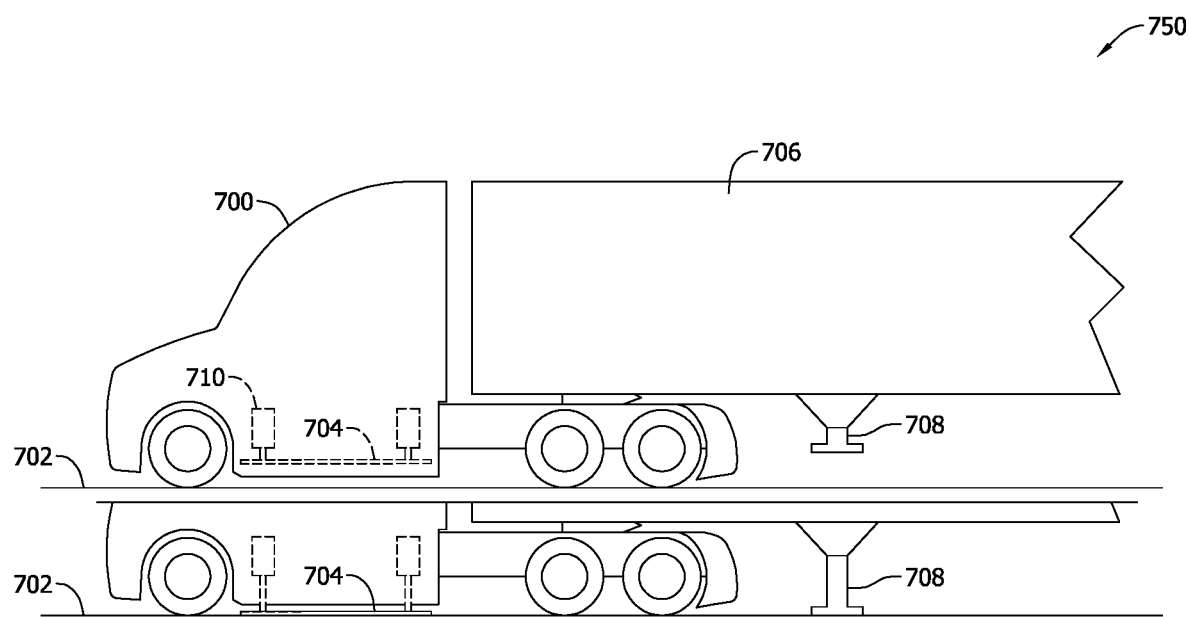
FIG. 7 is a schematic diagram of another embodiment autonomous truck configured to deploy a friction plate and trailer landing gear as a mode of destructive braking.

FIG. 7 is a schematic diagram of another embodiment autonomous truck 700 on roadway 702. Autonomous truck 700 includes a friction plate 704 coupled to a lower face of autonomous truck 700. Autonomous truck 700 tows a trailer 706 having a landing gear 708 configured to deploy and support trailer 706 when uncoupled from its truck. Autonomous truck 700 is configured to deploy friction plate 704 as a mode of destructive braking by actuating one or more actuators 710 (e.g., electromechanical actuators, solenoids, pneumatic or hydraulic actuators, or explosive charges or bolts) to deploy, or thrust down, friction plate 704 into contact with roadway 702. Additionally, autonomous truck 700 may be further configured to deploy landing gear 708 to generate additional contact with roadway 702.

FIG. 7 includes an illustration 750 of autonomous truck 700 once friction plate 704 or landing gear 708 are deployed onto roadway 702.

Figure 8:
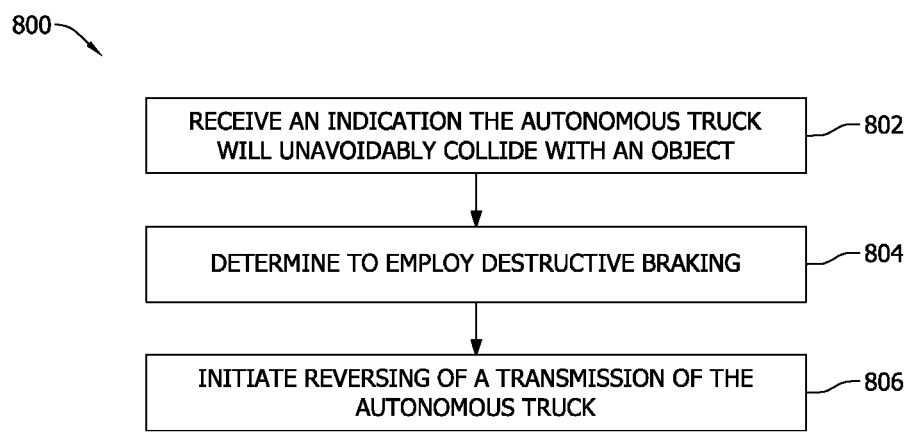
FIG. 8 is a flow diagram of an example embodiment of one method of destructive braking for an autonomous truck.

FIG. 8 is a flow diagram of an example embodiment of a method 800 of destructive braking for an autonomous truck, such as autonomous truck 100. Method 800 is embodied, for example, within a destructive braking system or a processing system, such as processing system 400 shown in FIG. 4. Processing system 400, for example, may itself be embodied in an autonomy computing system, such as autonomy computing system 302 shown in FIG. 3.

Referring to FIG. 2 and FIG. 4, processing system 400 receives 802 an indication the autonomous truck will unavoidably collide with object 206. Processing system 400 determines 804 to employ destructive braking. Processing system 400 then initiates 806 reversing of a transmission of the autonomous truck to reduce momentum of the autonomous truck. Initiating 806 reversal of the transmission may include, for example, instructing an ECU configured to control the transmission to reverse the transmission.

In certain embodiments, the indication is received from autonomy computing system 302 and, more specifically, from perception and understanding module 338. In determining 804 to employ destructive braking, processing system 400 may determine whether object 206 includes one or more living beings, e.g., humans or wildlife. When live beings are, or may be, present with sufficient confidence (e.g., probability) processing system 400 will determine to employ destructive braking. For example, if a passenger vehicle is detected, it is likely, or high probability, that human beings are present. Or, for example, if a pedestrian right of way such as a cross walk is detected but partially occluded, it is likely, or high probability, that human beings are present. If living beings are not likely to be present and the collision is limited to property, then destructive braking may be selectively employed as a configurable parameter for operators of autonomous trucks.

In determining 804 to employ destructive braking, processing system 400 may, in certain embodiments, compute an expected, or estimated, destructive braking stopping distance, e.g., destructive braking stopping distance 212 shown in FIG. 2. Destructive braking stopping distance 212 is often less than normal emergency stopping distance 210 and, when destructive braking stopping distance 212 suggests the otherwise unavoidable collision can be avoided or mitigated, then destructive braking is employed.

Figure 9:
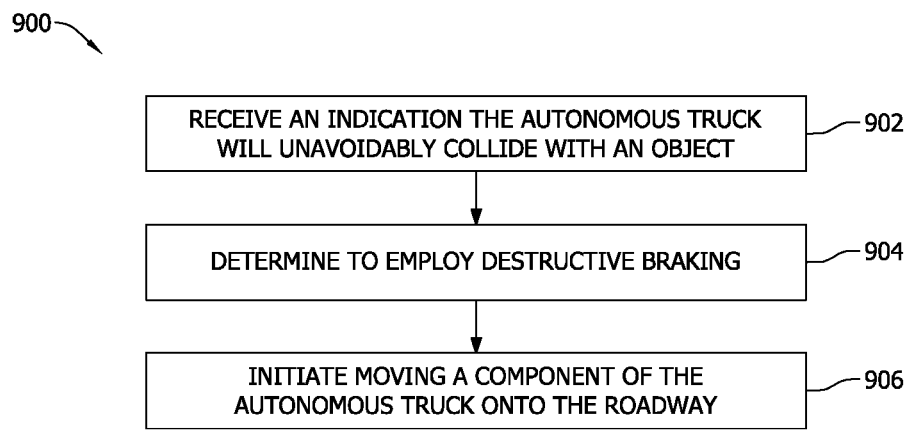
FIG. 9 is a flow diagram of an example embodiment of another method of destructive braking for an autonomous truck.

FIG. 9 is a flow diagram of an example embodiment of a method 900 of destructive braking for an autonomous truck, such as autonomous truck 100. Method 900 is embodied, for example, within a destructive braking system or a processing system, such as processing system 400 shown in FIG. 4. Processing system 400, for example, may itself be embodied in an autonomy computing system, such as autonomy computing system 302 shown in FIG. 3.

Referring to FIG. 2 and FIG. 4, processing system 400 receives 902 an indication the autonomous truck will unavoidably collide with object 206. Processing system 400 determines 904 to employ destructive braking. Processing system 400 then initiates 906 dropping a component of the autonomous truck onto the roadway to reduce momentum of the autonomous truck. Dropping a component of the autonomous truck may, in certain embodiments, include rupturing tires on one or more axles of the autonomous truck. Alternatively, dropping a component of the autonomous truck may include ejecting wheels from one or more axles of the autonomous truck. In further alternative embodiments, dropping the component of the autonomous truck may include deploying a friction plate onto the roadway to further slow the autonomous truck.

An example technical effect of the methods, systems, and apparatus described herein includes at least one of: (a) employing destructive braking in autonomous trucks to avoid or mitigate otherwise unavoidable collisions; (b) reversing the transmission on an autonomous truck to avoid or mitigate otherwise unavoidable collisions, thereby potentially damaging or destroying the transmission or combustion engine; (c) rupturing tires on one or more axles of an autonomous truck to avoid or mitigate otherwise unavoidable collisions, thereby potentially damaging or destroying wheels, axles, hubs, or the chassis of the autonomous truck, and the road onto which the undercarriage of the autonomous truck contacts; (d) ejecting wheels from one or more axles of an autonomous truck to avoid or mitigate otherwise unavoidable collisions, thereby potentially damaging or destroying wheels, axles, hubs, or the chassis of the autonomous truck, and the road onto which the undercarriage of the autonomous truck contacts; or (e) deploying a friction plate or trailer landing gear on an autonomous truck to avoid or mitigate otherwise unavoidable collisions, thereby potentially damaging the friction plate, landing gear, and the road onto which the components of the autonomous truck contact.

Some embodiments involve the use of one or more electronic processing or computing devices. As used herein, the terms "processor" and "computer" and related terms, e.g., "processing device," and "computing device" are not limited to a single instance and are not limited to just those integrated circuits referred to in the art as a computer, but broadly refers to at least one processor, processing device or system, general purpose central processing unit (CPU), graphics processing unit (GPU), microcontroller, microcomputer, programmable logic controller (PLC), reduced instruction set computer (RISC) processor, field programmable gate array (FPGA), digital signal processor (DSP), application specific integrated circuit (ASIC), and one or more other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A destructive braking system for an autonomous truck traveling on a roadway, the system comprising:
    an electronic control unit (ECU) configured for controlling a transmission for the autonomous truck; and
    a processing system communicatively coupled to the ECU, the processing system comprising at least one processor coupled to a memory, the memory storing executable instructions that, upon execution by the processor, configure the at least one processor to:
        receive an indication the autonomous truck will unavoidably collide with an object;
        determine to employ destructive braking; and
        instruct the ECU to reverse the transmission to reduce momentum of the autonomous truck.

2. The destructive braking system of claim 1, wherein the processing system includes an autonomy computing system.

3. The destructive braking system of claim 2, wherein the at least one processor is configured to receive the indication from another module executing on the autonomy computing system.

4. The destructive braking system of claim 1, wherein the at least one processor is further configured, in determining to employ destructive braking, to determine the object includes one or more living beings.

5. The destructive braking system of claim 1, wherein the at least one processor is further configured, in determining to employ destructive braking, to compute a destructive braking stopping distance.

6. The destructive braking system of claim 5, wherein the at least one processor is further configured, in determining to employ destructive braking, to compute the destructive braking stopping distance is less than a closing distance to the object.

7. The destructive braking system of claim 1, wherein the at least one processor is further configured, in instructing the ECU, to transmit a command to the ECU over a bus to which the destructive braking system and the ECU are coupled.

8. The destructive braking system of claim 1 further comprising a plurality of tires disposed on the autonomous truck, the plurality of tires having a high coefficient of friction to increase traction and stopping power of reversing.

9. A processing system for destructive braking for an autonomous truck, the processing system comprising:
   a memory storing executable instructions representing a destructive braking module; and
   at least one processor coupled to the memory and configured to execute the destructive braking module, the at least one processor, upon execution of the destructive braking module, configured to:
      receive an indication the autonomous truck will unavoidably collide with an object;
      determine to employ destructive braking; and
      instruct an ECU configured to control a transmission of the autonomous truck to reverse the transmission to reduce momentum of the autonomous truck.

10. The processing system of claim 9, wherein the memory is further configured to store a perception and understanding module configured to detect, in combination with at least one sensor, the object and generate the indication the autonomous truck will unavoidably collide with the object.

11. The processing system of claim 10, wherein the at least one processor is configured to receive the indication from the perception and understanding module.

12. The processing system of claim 9, wherein the at least one processor is further configured, in determining to employ destructive braking, to determine the object includes one or more living beings.

13. The processing system of claim 9, wherein the at least one processor is further configured, in determining to employ destructive braking, to compute a destructive braking stopping distance.

14. The processing system of claim 13, wherein the at least one processor is further configured, in determining to employ destructive braking, to compute the destructive braking stopping distance is less than a closing distance to the object.

15. The processing system of claim 9, wherein the at least one processor is further configured, in instructing the ECU, to transmit a command to the ECU over a bus to which the destructive braking system and the ECU are coupled.

16. A method of destructive braking for an autonomous truck, the method comprising:
   receiving an indication the autonomous truck will unavoidably collide with an object;
   determining to employ destructive braking; and
   initiating reversing of a transmission of the autonomous truck to reduce momentum of the autonomous truck.

17. The method of claim 16, wherein initiating reversing comprises instructing an ECU configured to control the transmission to reverse the transmission.

18. The method of claim 16, wherein receiving the indication comprises receiving the indication from a perception and understanding module executing on an autonomy computing system.

19. The method of claim 16, wherein determining to employ destructive braking comprises determining the object includes one or more living beings.

20. The method of claim 16, wherein determining to employ destructive braking comprises computing a destructive braking stopping distance.

21. The method of claim 20, wherein determining to employ destructive braking comprises computing the destructive braking stopping distance is less than a closing distance to the object.

* * * * *